United States Patent
Yen et al.

(10) Patent No.: US 7,780,125 B2
(45) Date of Patent: Aug. 24, 2010

(54) SUPPORT FRAME FOR A VARIETY KINDS OF DISPLAY DEVICES

(75) Inventors: Ching-Hui Yen, Banciao (TW); Chun-Lung Chen, Banciao (TW)

(73) Assignee: Syncmold Enterprise Corp., Jhonghe (TW)

( * ) Notice: Subject to any disclaimer, the term of this patent is extended or adjusted under 35 U.S.C. 154(b) by 194 days.

(21) Appl. No.: 12/172,695

(22) Filed: Jul. 14, 2008

(65) Prior Publication Data

US 2010/0006716 A1 Jan. 14, 2010

(51) Int. Cl.
*A47F 5/00* (2006.01)

(52) U.S. Cl. .................... 248/125.1; 248/414; 248/917; 248/920

(58) Field of Classification Search .............. 248/122.1, 248/123.11, 125.1, 125.8, 414, 917, 919, 248/920

See application file for complete search history.

(56) References Cited

U.S. PATENT DOCUMENTS

| 6,712,321 | B1* | 3/2004 | Su et al. | 248/123.11 |
| 7,413,150 | B1* | 8/2008 | Hsu | 248/123.11 |
| 2006/0219849 | A1* | 10/2006 | Chiu | 248/125.8 |
| 2007/0235601 | A1* | 10/2007 | Yen et al. | 248/122.1 |
| 2007/0262210 | A1* | 11/2007 | Oh et al. | 248/125.1 |
| 2009/0166482 | A1* | 7/2009 | Gan et al. | 248/122.1 |

* cited by examiner

*Primary Examiner*—J. Allen Shriver, II
*Assistant Examiner*—Bradley H Duckworth
(74) *Attorney, Agent, or Firm*—C. G. Mersereau; Nikolai & Mersereau, P.A.

(57) ABSTRACT

A support frame for a variety of display devices includes a base, a frame, a sliding part, and a rotation part. The frame is located on the base and has a receiving portion and at least one friction enhancer located in the receiving portion. The sliding part can slide upwards or downwards is located at the frame. The rotation part, pivoted with the sliding part, rotates between a fixed location and a release location; and furthermore has a leaning portion that extends into the receiving portion of the frame. When the rotation part is located at the fixed location, the leaning portion tightly leans against the friction enhancer so that the display device is positioned at the frame. When the rotation part is located at the release location, there is a distance between the leaning portion and the friction enhancer so that the display device can slide upwards or downwards.

13 Claims, 8 Drawing Sheets

SUPPORT FRAME FOR A VARIETY KINDS OF DISPLAY DEVICES

BACKGROUND OF THE INVENTION

1. Field of the Invention

The present invention relates to a support frame. In particular, the present invention relates to a support frame that can match a variety of display devices to adjust the location of the display devices and position the display devices, without replacing the support frame components.

2. Description of the Related Art

Taiwan patent TW 92205247, published on May 11, 2004, discloses a support frame for a display device. The support frame for a display device includes a base, a fastening part, a sliding part, a flexible part and a shaft rod. The fastening part extends upwards from the base and forms a hollow portion. The sliding part has an upper end and a lower end. The upper end of the sliding part is connected with the display device and the lower end of the sliding part is slidably plugged into the hollow portion. The flexible part includes a free end that is connected with the fastening part, an extending portion, and a rolling portion located in the hollow portion. The shaft rod is plugged into the rolling portion of the flexible part, and the two ends of the shaft rod are respectively connected with the lower end of the sliding part. When the display device is exerted with an external force so that the sliding part slides upwards or downwards, the display device can be positioned at any location when the external force is removed (i.e. when the external force is finished being applied to the display device) due to the flexible force of the flexible part is equal to the weight of the display device.

The support frame of the prior art uses the flexible force of the flexible part to balance the weight of the display device and positions the display device to a desired location. However, the single flexible force merely provides a fixed flexible force so that the support frame only matches with the display device with a single dimension and the same weight. When a display device with different dimension and weight (i.e. different type, kind, or brand of display device) is carried on to the support frame, the flexible part in the support frame needs to be replaced with another flexible part for matching the display device. Therefore, it is inconvenient for the user to use the support frame of the prior art to match a variety of display devices.

SUMMARY OF THE INVENTION

One particular aspect of the present invention is to provide a support frame that can match a variety of display devices to adjust the location of the display devices and position the display devices, without replacing the support frame components.

The support frame for a variety of displays devices of the present invention is used for carrying a display device. The support frame for a variety kinds of display devices includes a base, a frame located on the base and having a receiving portion and at least one friction enhancer located in the receiving portion, a fixed force elastic component located in the receiving portion of the frame and having a connection terminal, a sliding part that can slide upwards or downwards located at the frame, and a rotation part connected with the connection terminal of the fixed force elastic component. The rotation part is pivoted with the sliding part and has a rotation related to the sliding part between a fixed location and a release location. The rotation part has a leaning portion that corresponds to the friction enhancer, and the leaning portion extends into the receiving portion of the frame. When the rotation part is located at the fixed location the leaning portion of the rotation part tightly leans against the friction enhancer so that the display device is positioned at the frame. When the rotation part is located at the release location, there is a distance between the leaning portion of the rotation part and the friction enhancer so that the display device can slide upwards or downwards due to an external force.

The present invention has the following characteristics. Without changing (i.e. replacing) any component, the support frame of the present invention can carry a variety of display devices, and position the display devices on the desired location.

For further understanding of the present invention, reference is made to the following detailed description illustrating the embodiments and examples of the present invention. The description is for illustrative purpose only and is not intended to limit the scope of the claim.

BRIEF DESCRIPTION OF THE DRAWINGS

The drawings included herein provide a further understanding of the present invention. A brief introduction of the drawings is as follows.

DETAILED DESCRIPTION OF THE PREFERRED EMBODIMENTS

Figure 1:
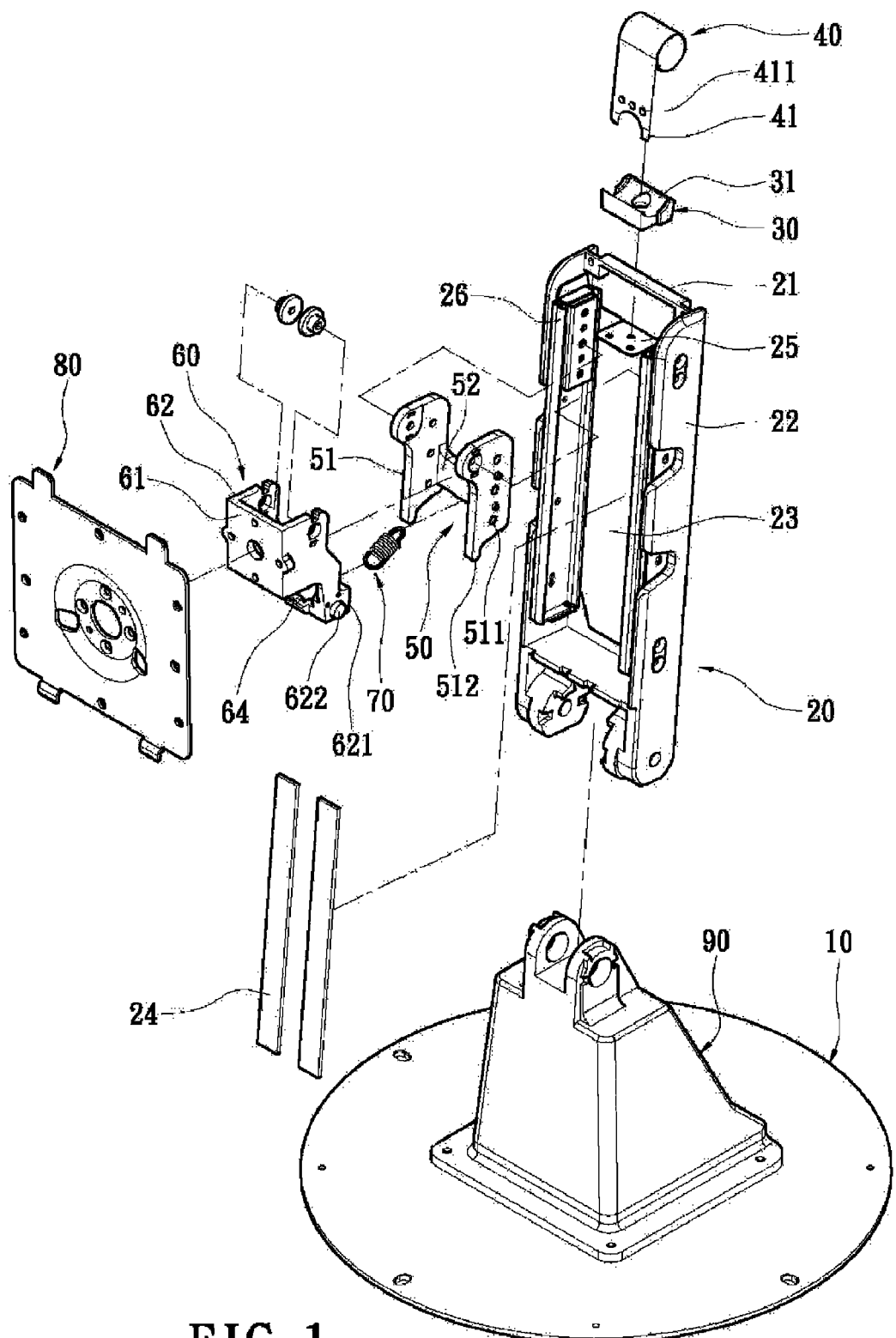
FIG. 1 is an exploded perspective view of the support frame of the present invention.

Reference is made to FIGS. 1-4. The support frame for a variety of display devices includes a base 10, a frame 20, a carry base 30, a fixed force elastic component 40, a sliding part 50, a rotation part 60, and a carrying board 80. The frame 20 is located at the base 10 and has a rear wall 21 and two side walls 22 extending forwards and parallel from the two sides of the rear wall 21. The rear wall 21 and the two side walls 22 form a receiving portion 23.

Two friction enhancers 24 that are parallel and have a distance in-between are pasted on the front side of the rear wall 21 and are located in the receiving portion 23. In this embodiment, the friction enhancer 24 is made of a soft rubber material having a high friction coefficient, and its quantity is two, but does not have to be limited to the above quantity. The frame 20 also has a fastened board 25 located in the receiving portion 23 and furthermore the fastened board 25 is located near the top of the receiving portion 23.

The carrying base 30 is located at the fastened board 25 in the receiving portion 23 and the top of the carrying base 30 forms a concave arc surface 31.

In this embodiment, the fixed force elastic component 40 is a constant force spring having a rolled board shape and a strong spring force. The fixed force elastic component 40 has a connection terminal 41, and the connection terminal 41 has a plurality of connection holes 411. The fixed force elastic component 40 is located on the concave arc surface 31 of the carrying base 30 and is located in the receiving portion 23 of the frame 20.

The sliding part 50 includes two side boards 51 and a transverse board 52. The two side boards are parallel and have the assembly holes 511 with equal distances. A sliding track set 26 is screwed onto the assembly holes 511 (referring to FIG. 1), and the sliding track set 26 is assembled at the inner side of the two side walls 22 of the frame 20 so that the sliding part 50 is located at the frame 20 and can slide upwards and downwards via the sliding track set 26.

The bottoms of the two side boards 51 of the sliding part 50 respectively extend to form a blocking portion 512. The traverse board 52 is connected between the two side boards 51, and furthermore the rear side of the bottom of the traverse board 52 has a hook portion 53 (referring to FIG. 2).

Figure 2:
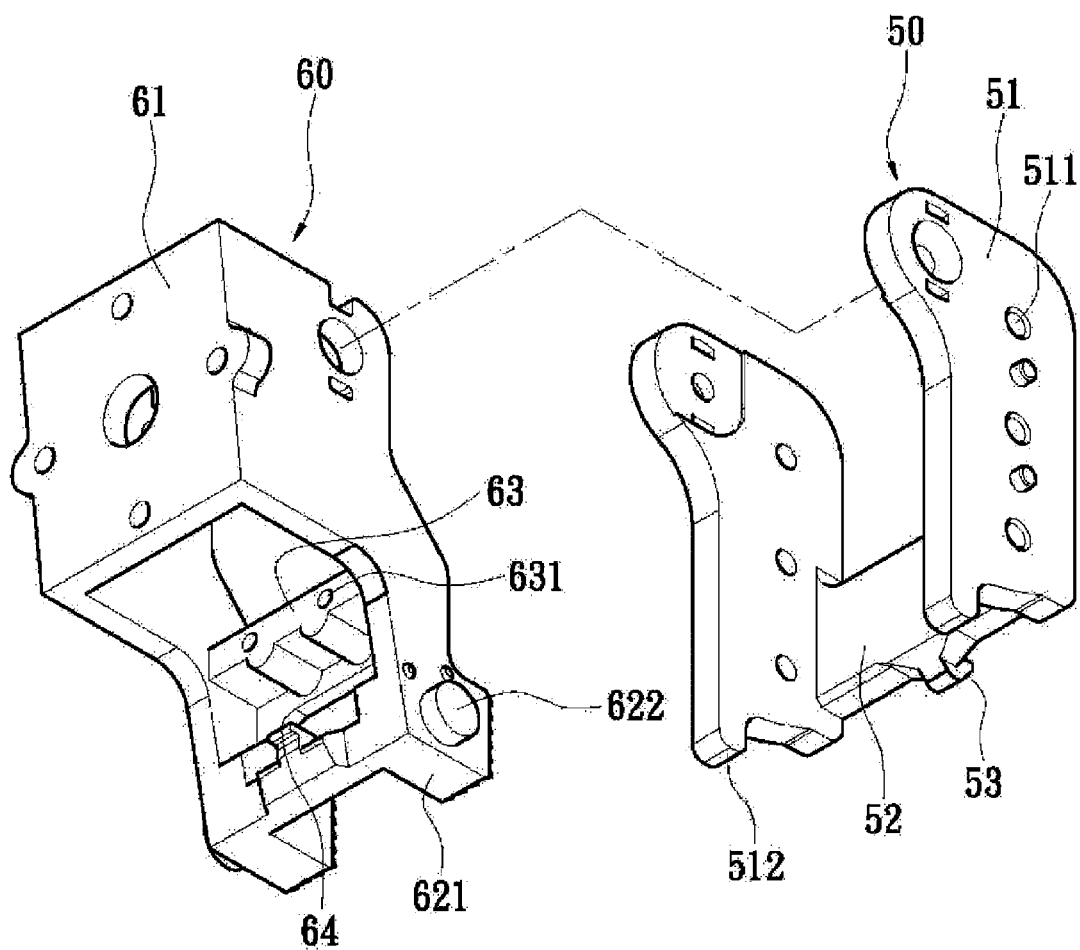
FIG. 2 is a perspective view of the sliding part and the rotation part of the present invention.
Figure 3:
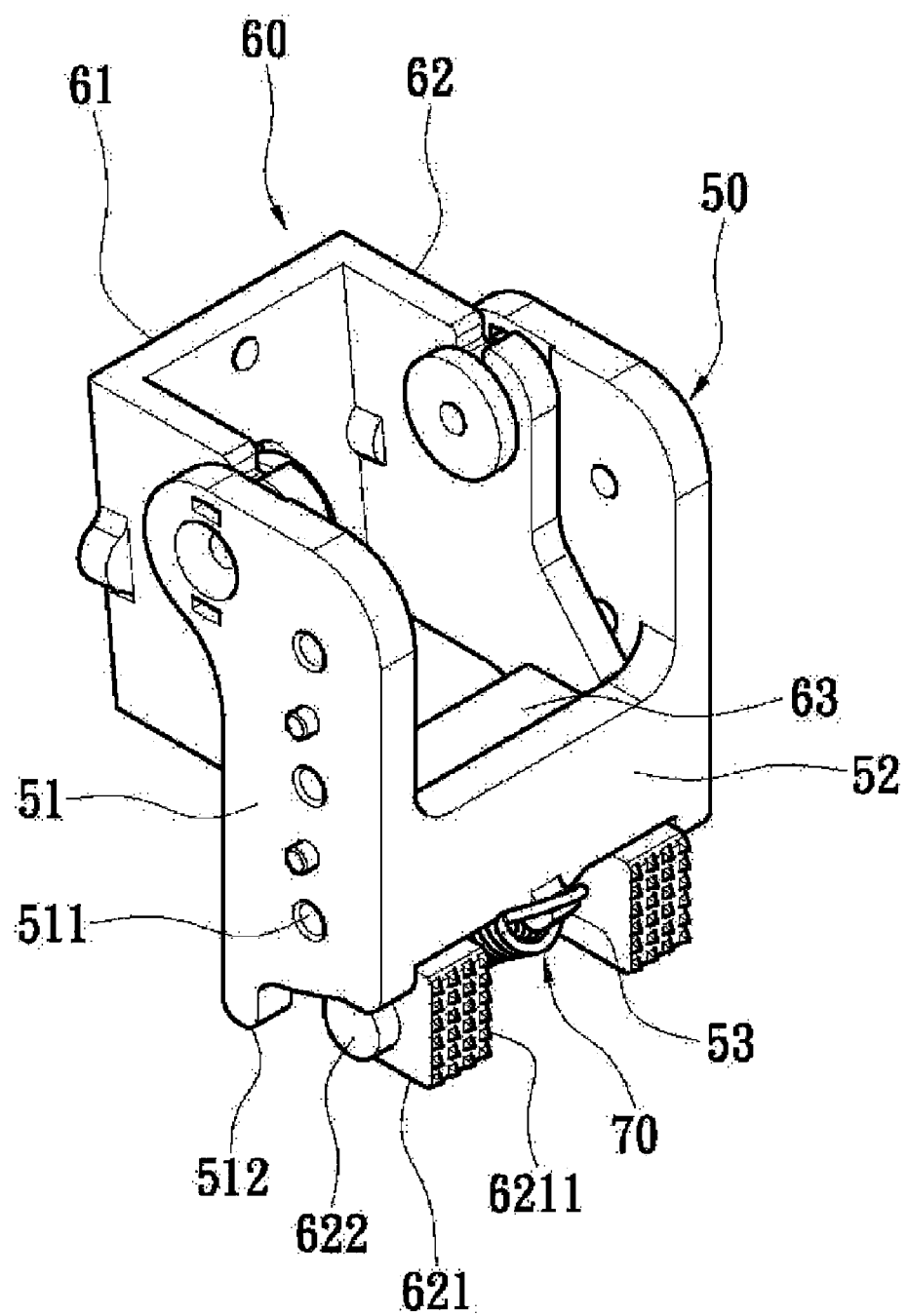
FIG. 3 is an assembly perspective view of the sliding part, the rotation part and the flexible part of the present invention.

The rotation part 60 has a front wall 61, two side walls 62 extending from two sides of the front wall 61 in parallel, and a traverse wall 63 connected between the side walls 62 (referring to FIG. 2). The rear side of the bottom of each of the side wall 62 extends forwards to the frame 20 to form a leaning portion 621. The leaning portion 621 corresponds to the friction enhancer 24, and extends into receiving portion 23 of the frame 20. The rear surface of the leaning portion 621 protrudes to form a plurality of tooth portions (referring to FIG. 3) for being plugged into the friction enhancer 24 (i.e. for coming into contact and grip with the friction enhancer 24).

The two side walls 62 of the rotation part 60 respectively protrude outward and forward to form a contacting portion 622 with a short column shape. The two contacting portions 622 respectively correspond to the two blocking portions 512 of the sliding portion 50. The front surface of the traverse board 63 has a plurality of positioning holes 631 (referring to FIG. 2). The connection terminal 41 of the fixed force elastic component 40 is connected with the positioning holes 631 of the traverse wall 63 of the rotation part 60 via the connection holes 411. The bottom of the rotation part 60 has a hook portion 64.

Figure 5:
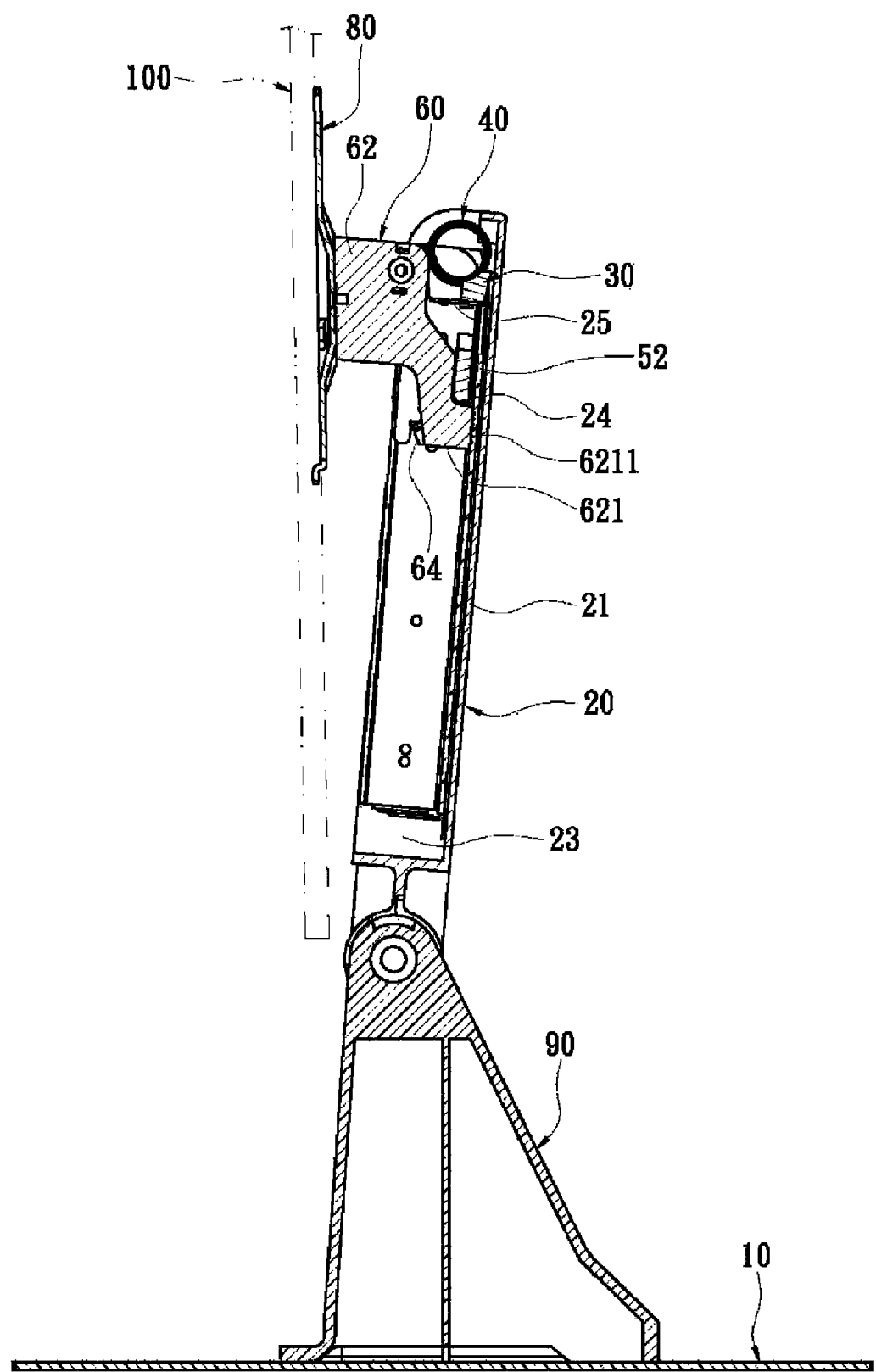
FIG. 5 is a cross-sectional view of the support frame of the present invention.
Figure 6:
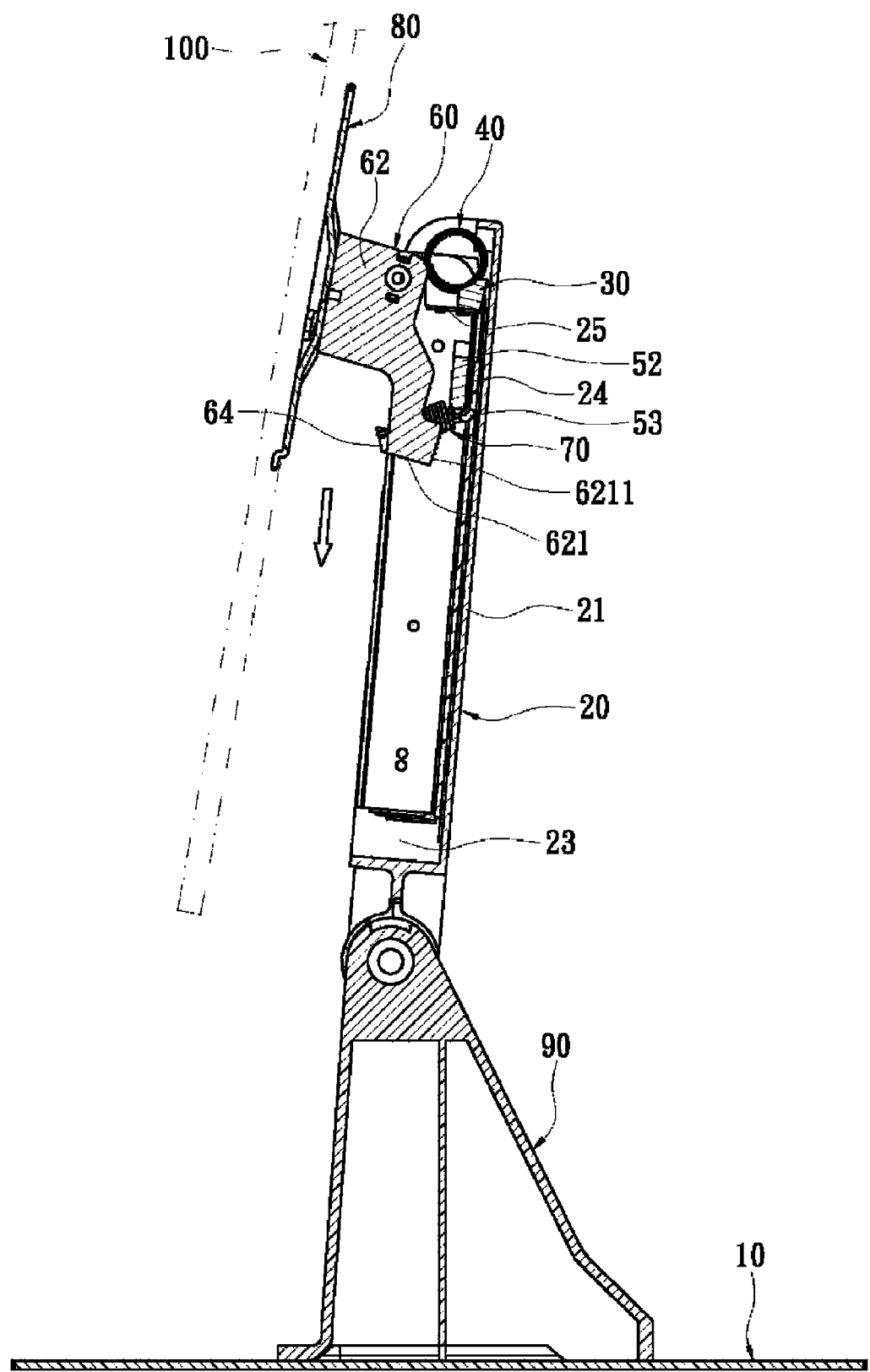
FIG. 6 is a schematic diagram of the operation of the support frame of the present invention.

The two side walls 62 of the rotation part 60 are respectively pivoted with the front side of the two side boards 51 of the sliding part 50, and cooperate with the blocking portion 512 via the contacting portion 622 so that the rotation part 60 rotates with the sliding art 50 between a fixed location (referring to FIG. 5) and a release location (referring to FIG. 6). When the rotation part 60 rotates to the release location, the contacting portion 622 contacts the blocking portion 512 of the sliding part 50.

In this embodiment, the flexible part 70 (see FIGS. 3 and 6) is a pull spring, but not limited to above. One end of the flexible part 70 is located at the hook portion 53 of the sliding part 50, another end of the flexible part 70 is located at the hook portion 64 of the rotation part 60 so that the flexible part 70 is located between the sliding part 50 and the rotation part 60 to provide a recovery force for the rotation part 60.

The carrying board 80 is rotatably pivoted with the front wall 61 of the rotation part 60 via a center shaft line C (referring to FIG. 4) so that the relative angle between the carrying board 80 and the rotation part 60 can be adjusted.

Figure 4:
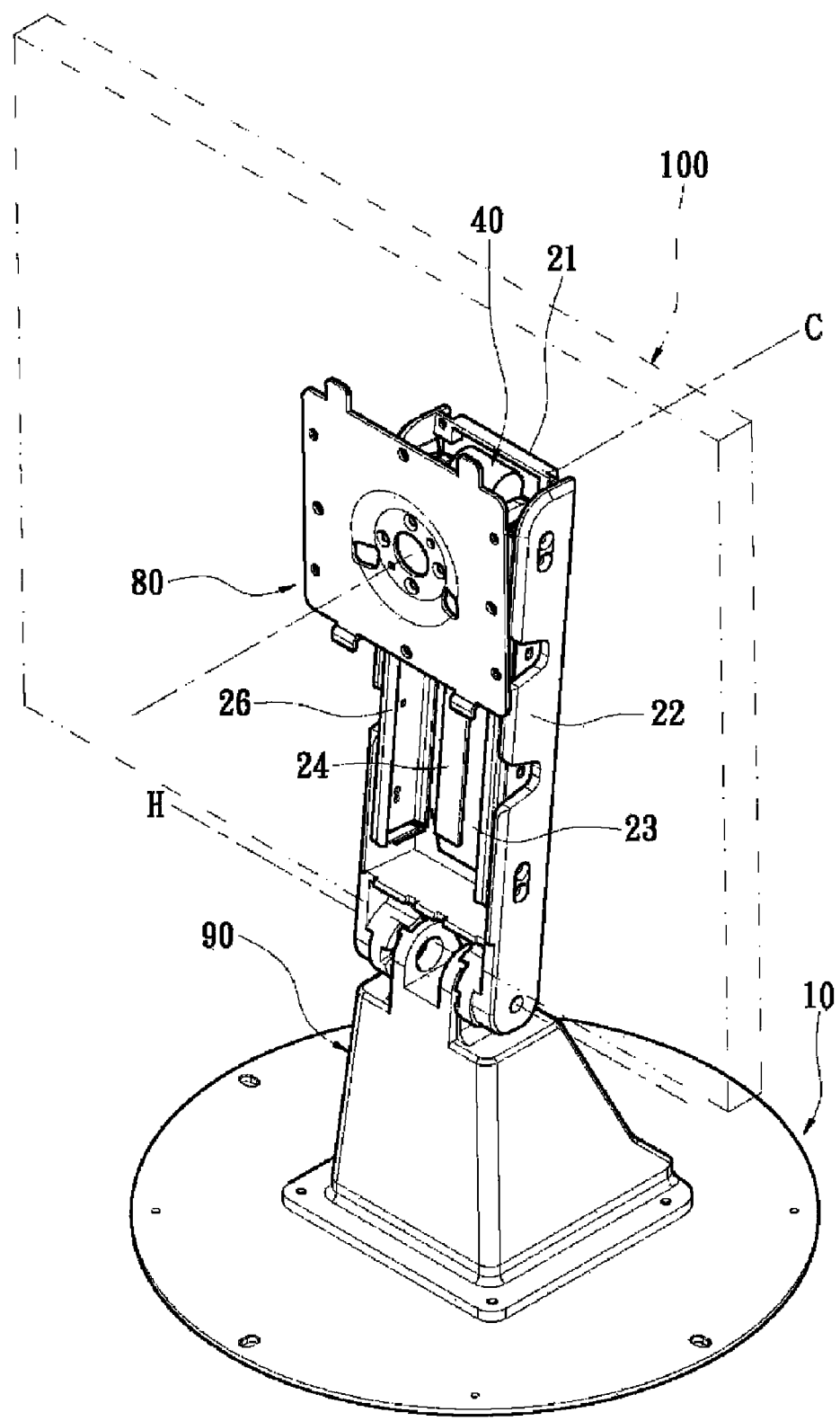
FIG. 4 is an assembly perspective view of the support frame of the present invention.

Reference is made to FIGS. 4 and 5. The support frame is used for carrying a display device 100. The carrying board 80 is fastened at the rear side of the display device 100 so that the display device 100 can rotate the center shaft line C via the carrying board 80. By utilizing the cooperation of the sliding part 50 and the frame 20, the display device 100 can slide upwards and downwards to adjust its height.

Reference is made to FIG. 6. When a user wishes to adjust the height of the display device 100, the user turns the bottom of the display device 100 to depart from the frame 20 to make the rotation part 60 be rotated to the release location and there is a distance between the leaning portion 621 of the rotation part 60 and the friction enhancer 40.

Figure 7:
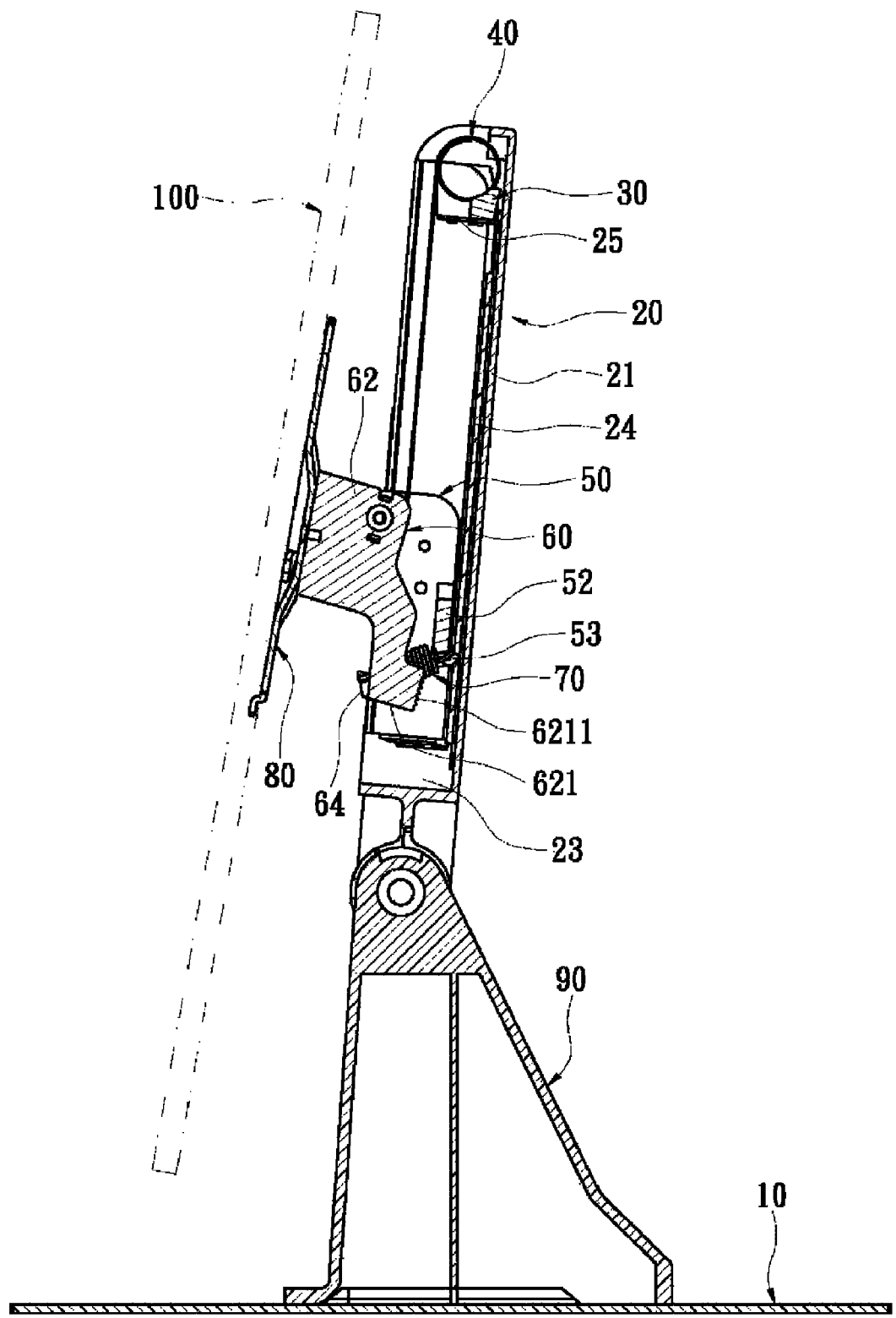
FIG. 7 is another schematic diagram of the operation of the support frame of the present invention.
Figure 8:
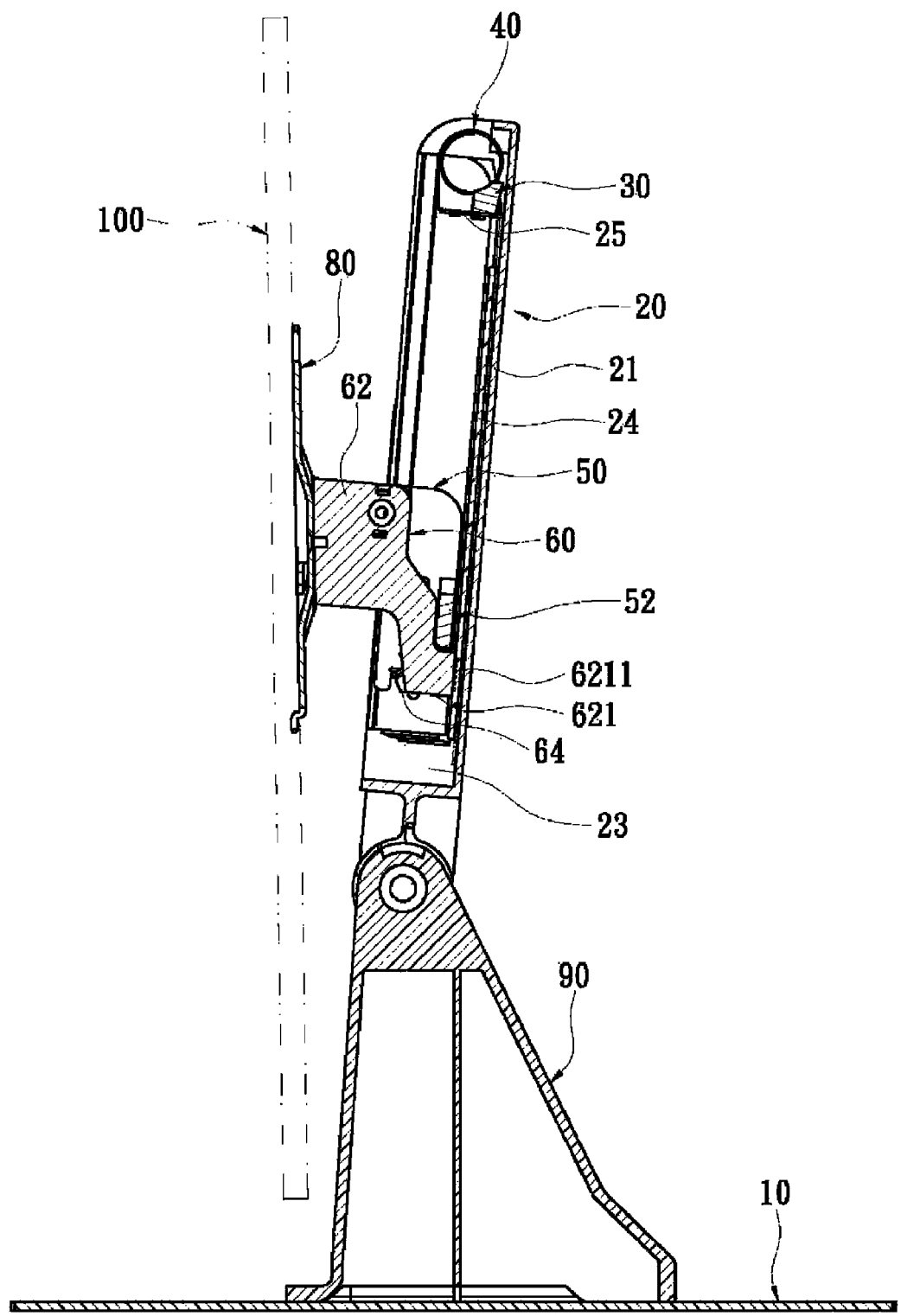
FIG. 8 is a further schematic diagram of the operation of the support frame of the present invention.

At this time, the user can exert an external force to make the display device 100 slide upwards or downwards (referring to FIG. 7) and the connection terminal 41 of the fixed force elastic component 40 is pulled downwards so that the fixed force elastic component 40 generates an upward recovery force. When the display device 100 slides to the desired location, the device display 100 is rotated forward to the frame 20 to the fixed location (referring to FIG. 8) so that the leaning portion 621 of the rotation part 60 tightly leans against the friction enhancer 24. By utilizing the flexible force of the fixed force elastic component 40 and the friction force of the friction enhancer 24, the display device 100 is positioned at the frame 20.

The support frame further includes a flexible part 70 located between the sliding part 50 and the rotation part 60 (referring to FIG. 1). In this embodiment, the flexible part 70 is a pull spring. but not limited to above. One end of the flexible part 70 is located at the hook portion 53 of the sliding part 50, another end of the flexible part 70 is located at the hook portion 64 of the rotation part 60 (referring to FIG. 2) for providing a recover; force for the rotation part 60.

Therefore, when the rotation part 60 is rotated to the release location, the flexible part 70 is in a pull-able status (referring to FIG. 6). After the display device 100 is released, the rotation part 60 automatically rotates to the fixed location (referring to FIG. 8) due to the recovery force generated by the flexible part 70 and the leaning portion 621 of the rotation part 60 tightly leans against the friction enhancer 24 in the frame 20 which increase the friction force between both.

The support frame further includes a connection part 90 (referring to FIG. 1). The bottom of the connection part 90 is fastened on the base 10. The top of the connection part 90 is pivoted with the bottom of the frame 20, and the connection part 90 can rotate a horizontal shaft line H (referring to FIG. 4) so that the angle of the display device 100 can be adjusted via the connection part 90.

The connection part 90 and the base 10 are two pieces. Alternatively the connection part 90 and the base 10 can be integrated into one piece to reduce the components, and the manufacturing and the assembly cost.

The support frame of the present invention uses the high flexible force of the fixed force elastic component 40 and the friction force of the leaning portion 621 of the rotation part 60 provided by the friction enhancer 24 to position the display device 100 to the desired location. Without changing/replacing any component (such as the fixed force elastic component 40), the support frame can carry a variety of display devices adjust the height of the display device and position the display device.

The description above only illustrates specific embodiments and examples of the present invention. The present invention should therefore cover various modifications and variations made to the herein-described structure and operations of the present invention, provided they fall within the scope of the present invention as defined in the following appended claims.

What is claimed is:

1. A support frame for a variety of display devices, used for carrying a display device, comprising:

a base;

a frame located on the base and having a receiving portion and at least one friction enhancer located in the receiving portion;

a fixed force elastic component located in the receiving portion of the frame and having a connection terminal;

a sliding part that slides upwards or downwards located at the frame; and a rotation part connected with the connection terminal of the fixed force elastic component, wherein the rotation part is pivoted with the sliding part and has a rotation related to the sliding part between a fixed location and a release location, the rotation part has a leaning portion that corresponds to the friction enhancer, and the leaning portion extends into the receiving portion of the: frame;

wherein, when the rotation part is located at the fixed location, the leaning portion of the rotation part tightly leans against the friction enhancer so that the display device is positioned at the frame, when the rotation part is located at the release location, there is a distance between the leaning portion of the rotation part and tile friction enhancer so that the display device slides upwards or downwards due to an external force.

2. The support frame for a variety of display devices as claimed in claim 1, wherein the top of the receiving portion of the frame has a carrying base, and the fixed force elastic component is located at the carrying base.

3. The support frame for a variety of display devices as claimed in claim 1, wherein the quantity of the friction enhancers is two and the two friction enhancers are located in the receiving portion with a distance in-between.

4. The support frame for a variety of display devices as claimed in claim 1, wherein the friction enhancer is made of soft material with a high friction coefficient.

5. The support frame for a variety of display devices as claimed in claim 1, wherein the sliding part has a blocking portion, the rotation part has a contacting portion, and the contacting portion of the rotation part contacts the blocking portion of the sliding part when the rotation part is located at the release location.

6. The support frame for a variety of display devices as claimed in claim 1, wherein the rear surface of the leaning portion of the rotation part has a plurality of tooth portions for being plugged into the friction enhancer.

7. The support frame for a variety of display devices as claimed in claim 1, wherein the frame has a rear wall and two side walls, the rear wall and the two side walls form the receiving portion, and the friction enhancer is located at the front side of the rear wall.

8. The support frame for a variety of display devices as claimed in claim 1, further comprising a connection part, wherein one end of the connection part is fastened to the base, another end of the connection part is pivoted with the bottom of the frame so that the angle of the display device is adjusted via the connection part.

9. The support frame for a variety of display devices as claimed in claim 8, further comprising a flexible part, wherein the flexible part is located between the sliding part and the rotation part to provide a recovery force for the rotation part.

10. The support frame for a variety of display devices as claimed in claim 8, wherein the connection part and the base are integrated into one piece.

11. The support frame for a variety of display devices as claimed in claim 10, further comprising a flexible part, wherein the flexible part is located between the sliding part and the rotation part to provide a recovery force for the rotation part.

12. The support frame for a variety of display devices as claimed in claim 1, further comprising a flexible part, wherein the flexible part is located between the sliding part and the rotation part to provide a recovery force for the rotation part.

13. The support frame for a variety of display devices as claimed in claim 1, further comprising a carrying board, wherein the carrying board is pivoted with the front side of the rotation part for combining with one side of the display device.

* * * * *